(12) United States Patent
Zhao et al.

(10) Patent No.: US 10,257,864 B2
(45) Date of Patent: Apr. 9, 2019

(54) METHOD AND APPARATUS FOR RANDOM ACCESS RELAY SYSTEM

(75) Inventors: Yali Zhao, Beijing (CN); Li Chen, Beijing (CN); Wei Bao, Beijing (CN); Ji-amin Liu, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 64 days.

(21) Appl. No.: 13/578,278

(22) PCT Filed: Jan. 30, 2011

(86) PCT No.: PCT/CN2011/070825
§ 371 (c)(1),
(2), (4) Date: Aug. 10, 2012

(87) PCT Pub. No.: WO2011/098016
PCT Pub. Date: Aug. 18, 2011

(65) Prior Publication Data
US 2012/0307716 A1 Dec. 6, 2012

(30) Foreign Application Priority Data
Feb. 11, 2010 (CN) .......................... 2010 1 0111781

(51) Int. Cl.
*H04B 7/14* (2006.01)
*H04W 74/08* (2009.01)
(Continued)

(52) U.S. Cl.
CPC ........ *H04W 74/0866* (2013.01); *H04B 7/155* (2013.01); *H04W 84/047* (2013.01)

(58) Field of Classification Search
CPC .. H04B 7/14; H04B 7/155; H04J 3/00; H04H 20/71; H04W 36/00; H04W 4/00; H04W 74/0875; H04W 74/0866; H04W 84/047
(Continued)

(56) References Cited

U.S. PATENT DOCUMENTS

2010/0080139 A1* 4/2010 Palanki ................ H04B 7/2606
370/252
2010/0195607 A1* 8/2010 Lee .................... H04W 74/0866
370/329
(Continued)

FOREIGN PATENT DOCUMENTS

CN 101448325 A 6/2009
CN 101472344 A 7/2009
(Continued)

OTHER PUBLICATIONS

3GPP TSG-RAN WG2 meeting #68bis Valencia, Spain, Jan. 18-22, 2010; R2-100176; Source: CATT; Title: Control Plane for Un interface; Agenda item: 6.9.3.2.*
(Continued)

*Primary Examiner* — Walli Z Butt
(74) *Attorney, Agent, or Firm* — Ladas & Parry, LLP

(57) ABSTRACT

The present invention discloses a method and apparatus for random access in a relay system, comprising: a Relay Node (RN) determines whether a random access is triggered, if the random access is triggered, the RN performs the random access by using a non-backhaul link subframe. In the present invention, if the random access of the RN working in a base station state is triggered, the RN can perform the random access by using partial or all of non-backhaul link subframe resources, that is, the RN can perform the random access by using the subframes of the Uu interface. The method can reduce the time delay for performing the random access of (Continued)

the RN working as a base station and improve the user experience.

20 Claims, 9 Drawing Sheets

(51) Int. Cl.
*H04B 7/155* (2006.01)
*H04W 84/04* (2009.01)
(58) Field of Classification Search
USPC ....... 370/315, 280, 312, 252, 336, 329, 254; 455/450, 434, 9
See application file for complete search history.

(56) References Cited

U.S. PATENT DOCUMENTS

2010/0273416 A1* 10/2010 Yi .......................... H04B 7/155
455/9
2012/0082088 A1* 4/2012 Dalsgaard ........... H04L 12/4625
370/315
2012/0307717 A1* 12/2012 Worrall ............. H04B 7/15557
370/315

FOREIGN PATENT DOCUMENTS

| | | |
|---|---|---|
| CN | 101478792 A | 7/2009 |
| CN | 101529754 A | 9/2009 |
| WO | 2008051037 A1 | 5/2008 |

OTHER PUBLICATIONS

International Search Report issued in International Patent Application No. PCT/CN2011/070825 dated May 5, 2011.
European Patent Office, Extended European Search Report, European Patent Application No. 11741887.1, dated Oct. 27, 2016.
ETRI, "Consideration on MAC procedures for Un Interface", 3GPP TSG RAN WG2 #68, R2-096497, Nov. 9-13, 2009, Jeju, Korea.
Nokia Siemens Networks, Nokia Corporation, "RLF of RN on Un Interface", 3GPP TSG-RAN WG2 Meeting #70, R2-103067, May 10-14, 2010, Montreal, Canada.
CATT, "Control Plane for Un interface", 3GPP TSG-RAN WG2 meeting #68bis, R2-100176, Jan. 18-22, 2010, Valenica, Spain.

* cited by examiner

METHOD AND APPARATUS FOR RANDOM ACCESS RELAY SYSTEM

This application claims the priority to the Chinese Patent Application No. 2010101117813 titled "Method and Apparatus for Random Access in Relay System" filed to the Patent Office of the People's Republic of China on Feb. 11, 2010, the entire disclosure of which is incorporated by reference herein.

FIELD OF THE INVENTION

The present invention relates to the field of communication technology, in particular to the method and apparatus for random access in a relay system.

BACKGROUND OF THE INVENTION

The background of the present invention is described hereinbelow:

(1) Random access of an LTE (Long Term Evolution) system. The reasons that a random access may be triggered by the LTE system include: initial access; handover caused by RRC (Radio Resource Control) connection reestablishment and mobility; downlink (DL) data arrival while uplink (UL) loss in RRC connected status; in RRC connected status, UL data arrival while DL loss or no D-SR (dedicated scheduling request) resources or the maximum number of D-SR transmissions having been reached; intra-cell handover due to security reasons; and positioning, etc.

For the intra-cell handover caused due to DL data arrival, mobility handover and security reasons, if a dedicated preamble (Random Access Preamble) is available, a non-contention based random access may be selected. FIG. 1 shows a schematic diagram of the non-contention based random access, including:

Msg0: a base station allocates a dedicated ra-PreambleIndex for non-contention based random access and a PRACH (Packet Random Access Channel) resources for random access, that is, ra-PRACH-MaskIndex (PRACH Mask Index) to the UE (User Equipment).

For a non-contention based random access caused by the DL data arrival, the message is passed by use of PDCCH (Physical Downlink Control Channel); while for a non-contention based random access caused by the handover, the message is passed via the handover command.

Msg1: the UE sends an appointed dedicated preamble to the base station through the designated PRACH resources according to the ra-PreambleIndex and ra-PRACH-MaskIndex instructed by the Msg0. After receiving the Msg1, the base station calculates the UL TA (Timing Alignment) according to the Msg1.

Mgs2: the base station sends a random access response (RAR) message to the UE, the RAR contains the TA information, informing the UE of the TA of the follow-up UL transmission.

For the random accesses caused by other reasons, the contention-based random access may be adopted, as shown in FIG. 2. In the LTE system, the basic mechanism of the contention-based random access is shown as follows: in a plurality of preambles available, the terminal randomly selects a preamble, and sends it through an RACH (Random Access Channel); after receiving the preamble, the network calculates the deviation between the actual arrival time and expected arrival time of the preamble, and then marks the deviation as a TA and sends it to the terminal through an RAR message. After receiving the TV, the terminal may establish a UL synchronism with the network by adjusting the sending time of the UL message with the TA. Upon completion of TA, the terminal also needs to send its unique ID to the network side in order to eliminate the collision.

FIG. 2 is the process diagram of the contention-based random access solution in the LTE system.

Msg1: the terminal randomly selects a preamble among all preambles available and sends the preamble through an RACH. When the terminal sends the preamble, the base station also detects the RACH, and calculates the corresponding TA of the preamble if the preamble is detected.

Msg2: the base station sends an RAR message of the preamble detected, which contains the following information: (1) identity information of the preamble received, such as serial number and sending time; (2) corresponding TA of the preamble received; (3) information on channel resources allocated for the subsequent UL data transmission, including the frequency-time position of resources and MCS (modulation and coding style), etc., and (4) a temporary ID allocated for users by the base station (such as C-RNTI).

Furthermore, after receiving the RAR message, the terminal determines whether the target terminal of the RAR message is the terminal itself by using the identity information of the preamble in the RAR message, and if yes, adjusts the sending TA of the UL signals according to the TA information in the RAR message.

Msg3: the terminal sends the UL data. The UL resources used by the UL data are those allocated for the terminal by the base station in the Msg2. The UL data sent by the terminal includes at least: identity information of the terminal, such as IMSI (International Mobile Subscriber Identity), TMSI (Temporary Mobile Subscriber Identity), or C-RNTI (Cell Radio Network Temporary Identity).

Msg4: the base station detects whether the terminal identity information sent in the Msg3 by the terminal is legal, and notifies the terminal of the detection results by sending a contention resolution message.

After completing the aforesaid procedure of random access, the terminal and the base station may realize the UL data transmission.

(2) Network structure of an LTE-A (LTE-Advanced) system: FIG. 3 shows a network structure diagram of the LTE-A system.

a. An eNB (Evolved Node B) is connected to a core network (CN) through a wired interface.

b. The RN (Relay Node) is connected to the eNB through a radio interface which is called Un interface. The corresponding radio link is called backhaul link (BH link), and the eNB connected with the RN is called donor eNB (DeNB) of the RN.

c. The UE is connected to the RN or eNB through a radio interface which is called Uu interface. The corresponding radio link is called access link (AC link), the UE directly connected with the eNB is called Marco UE, and the UE directly connected with the RN is called R-UE.

(3) Design of BH Link

The introduction of an RN provides three radio links in the RN-based mobile communication system, namely, an access link between the DeNB and the Marco UE (Marco UE AC link), a backhaul link between the DeNB and the RN (BH link), and an access link between the RN and the R-UE (R-UE AC link).

Specifically, as the RN is an in-bank relay node, that is, interference occurs if the RN sends/receives data to/from the R-UE when sending/receiving DeNB signals, the BH link and the R-UE AC link can't co-exist simultaneously in order to avoid the self interference. However, the Marco UE AC link and the BH link can coexist, provided that the time-frequency resources of the two are orthogonal.

A method for coordinating the BH link and the R-UE AC link is to build "gaps" within the DL access transmission time of the R-UE at the Uu interface, wherein, the gaps are used for the DL BH link, and the configuration of the gaps may be realized by using an MBSFN (Multicast Broadcast Single Frequency Network) subframe.

FIG. 4 shows a schematic diagram of the DL link transmission by using an MBSFN subframe. The DeNB and the RN realizes the DL transmission among these gaps, while there is no DL transmission between the RN and the R-UE.

In addition, the UL BH subframe is corresponding to the DL BH subframe, and the UL BH subframe may be instructed in an explicit or implicit way. Similarly, to avoid the self interference of the RN, the UL BH subframe on the BH link can only be used for the UL transmission between the RN and the DeNB, and the R-UE is limited to the UL transmission on the Uu interface or between the RNs.

(4) RN status of the LET-A system: the start-up procedure of an RN in the LET-A system includes the following steps: 1) building a synchronism with the DeNB and a connection with the RRC through an random access procedure; 2) being attached to the network through the Attach procedure; 3) downloading the configuration information from a Q&M system; and 4) building the S1 and X2 interfaces.

For the aforesaid step 1) and 2), the RN works according to the UE mode. After completing the step 4), the RN works as a base station. If working in UE mode, the RN may use all resources of the system without limitation by the BH subframe; if working in the base station mode, the RN may perform the data transmission of the Un interface only by using the UL/DL BH subframe.

(5) Random access of an RN: in the LTE-A system, no matter whether the RN works in UE mode or base station mode, the random access procedure is not avoided.

Specifically, if an RN works in UE mode, the reason that a random access may be triggered include: initial access; if the RN works in base station status, the reason that a random access may be triggered include: RRC connection reestablishment of the RN, such as failure of radio link at the Un interface; DL data arrival but UL loss in RRC connected status; in RRC connected status, UL data arrival while DL loss or no D-SR resources or the maximum number of D-SR transmissions having been reached; intra-cell handover caused due to security reason.

In the process of realizing the objects of the present invention, at least the following problems existing in the prior art were found: during the startup of the RN, if working in UE mode, the RN may use all subframe resources for the BH-subframes are not available in this case, and the random access of the RN startup is consistent with that of the ordinary UE. However, if working in base station mode, the RN working as a base station can only use the BH link resources of the Un interface if any random access is triggered, and the limitation of BH subframes will result in the time delay for performing the random access of the RN, and influence the R-UE user experience.

SUMMARY OF THE INVENTION

The present invention provides a method and an apparatus for random access in a relay system, for the purpose of reducing the time delay for performing the random access of the RN working as a base station and improving the user experience.

To achieve the aforesaid objects, the present invention provides an apparatus for random access in a relay system, comprising:

A relay node (RN) determines whether a random access is triggered;

If the random access is triggered, the RN performs the random access by using a non-backhaul link subframe.

The present invention provides an apparatus for random access in a relay system, comprising:

A determination module, which is used for determining whether a random access is triggered; and A processing module, which is used for performing the random access by using a non-backhaul link subframe if the random access is triggered according to the judgment of the determination module.

Compared with the prior art, the present invention at least has the following advantages:

If a random access of an RN working in a base station state is triggered, the RN can perform the random access by using partial or all of non-backhaul link subframe resources, that is, the RN can perform the random access by using the subframes of a Uu interface. The method can reduce the time delay for performing the random access of the RN working as a base station and improve the user experience.

DETAILED DESCRIPTION OF PREFERRED EMBODIMENTS

In an LET-A system, a relay node (RN) is introduced in order to improve the system throughput and increase the network coverage. In the embodiments of the present invention, a method and an apparatus for random access in a relay system are put forward. If a random access of an RN working in a base station state is triggered, the RN can perform the random access by using partial or all of non-backhaul (BH) link subframes, that is, the RN can perform the random access by using the non-BH subframes. The method in accordance with the present invention can reduce the time delay for performing the random access of the RN working as a base station and improve the user experience.

Figure 5:
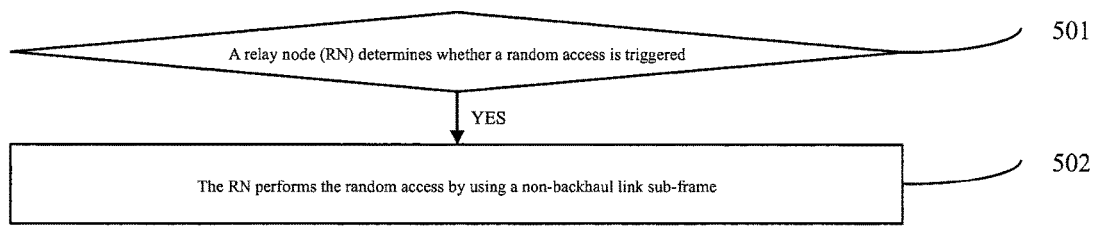
FIG. 5 is a process diagram for a random access method in a relay system provided in embodiment I of the present invention.

The embodiment I of the present invention provides a method for random access in a relay system, as shown in FIG. 5, comparing the following steps:

Step 501: an RN determines whether a random access is triggered, if the random access is triggered, go to step 502.

Step 502: the RN performs the random access by using a non-backhaul link subframe, wherein, the RN can perform the random access by using partial or all of non-backhaul link subframe resources.

In the first case, for a contention-based random access,

If the subframes used by the RN are not limited, the RN performs the random access by using a non-backhaul link subframe, comprising: the RN selects a random access preamble and a UL subframe, and sends the preamble to a network side by using an RACH of the UL subframe; after detecting the preamble, the network side sends an RAR message to the RN, and the RN monitors the DL subframes with PDCCHs in an RAR window to receive the RAR message and sends the UL data to the network side by using the UL resources allocated in the RAR message; when the network side sends a contention resolution message according to the UL data, the RN receives the contention resolution message in all the subframes with PDCCH if the mac-ContentionResolution timer is running.

If the Msg1 is limited by using the UL BH subframes, the RN performs the random access by using a non-backhaul link subframe, comparing: the RN selects a preamble and a UL BH subframe, and sends the preamble to a network side by using the RACH resources of the UL BH subframe; after detecting the preamble, the network side sends an RAR message to the RN, and the RN monitors the DL subframes with PDCCHs in the RAR window to receive the RAR message and sends the UL data to the network side by using the uplink resources allocated to the RAR message; when the network side sends a contention resolution message according to the UL data, the RN receives the contention resolution message in the DL subframes with PDCCH if the mac-ContentionResolution timer is running.

If the Msg4 is limited by using the BH subframes, the RN performs the random access by using a non-backhaul link subframe, comparing: the RN selects a preamble and a UL subframe, and sends the preamble to a network side by using the RACH resources of the UL subframe; after detecting the preamble, the network side sends an RAR message to the RN, and the RN monitors the DL subframes with PDCCHs in the RAR window to receive the RAR message and sends the UL data to the network side by using the UL resources allocated in the RAR message; when the network side sends a contention resolution message according to the UL data, the RN receives the contention resolution message in the DL BH subframes with PDCCH if the mac-ContentionResolution timer is running.

If the Msg1 and the Msg4 are simultaneously limited by using the BH subframes, the RN performs the random access by using a non-backhaul link subframe, comparing: the RN selects a preamble and a UL subframe, and sends the preamble to a network side by using the RACH resources of the UL BH subframe; after detecting the preamble, the network side sends an RAR message to the RN, and the RN monitors the DL subframes with PDCCHs in the RAR window to receive the RAR message and sends the UL data to the network side by using the UL resources allocated in the RAR message; when the network side sends a contention resolution message according to the UL data, the RN receives the contention resolution message in the DL BH subframes with PDCCH if the mac-ContentionResolution timer is running.

In the second case, for a non-contention based random access,

If the Msg1 and the Msg2 are simultaneously limited by using the BH subframes only, the RN performs the random access by using a non-backhaul link subframe, comparing: the network side sends a dedicated preamble assigned for the RN and a PRACH message to the RN through a DL BH subframe; the RN sends the dedicated preamble to the network side through the UL BH subframe according to the dedicated preamble and the PRACH message; the network side sends an RAR message to the RN through the DL BH subframe allocated for the RN according to the dedicated preamble; the RN monitors the PDCCHs in the DL subframes with PDCCHs in the RAR window to receive the RAR message.

If the Msg1 is limited by using the BH subframes only rather than the non-BH subframes, the RN performs the random access by using a non-backhaul link subframe, comparing: the network side sends a dedicated preamble assigned for the RN and a PRACH message to the RN through a DL BH subframe; the RN sends the dedicated preamble to the network side through the UL BH subframe according to the dedicated preamble and the PRACH message; the network side sends an RAR message to the RN according to the dedicated preamble, wherein, the subframes used to for sending the RAR message are not limited to DL BH; and the RN monitors the PDCCHs in the DL subframes with R-PDCCHs in the RAR window to receive the RAR message.

For a non-contention based random access, if the Msg2 is limited by using the BH subframes rather than the non-BH subframes, the RN performs the random access by using a non-backhaul link subframe, comparing: the network side sends a dedicated preamble assigned for the RN and a PRACH message to the RN through a DL BH subframe; the RN sends the dedicated preamble to the network side through the UL BH subframe or a UL non-BH subframe according to the dedicated preamble and the PRACH message; the network side sends an RAR message to the RN through the DL BH subframe according to the dedicated preamble; and the RN monitors the R-PDCCHs in the DL subframes with R-PDCCHs in the RAR window to receive the RAR message.

It should be noted that, the method for confirming whether the RN is allowed to use the non-BH subframes includes: pre-designation by the system, or notification by the network side in an explicit or implicit way, wherein, the notification by the network side in the explicit way specifically refers to notification by broadcasting or RRC message.

Furthermore, the RN performs the random access by using a non-backhaul link subframe, which also comprises the previous steps: the RN sends an RRC connection release message to all R-UEs that it serves, and releases the RRC connections of all R-UEs to stop sending the broadcast and paging messages; the RN performs the random access by using a non-backhaul link subframe, which also comprises the follow-up steps: the RN continues to send the broadcast and paging messages and readmits the R-UEs within the coverage of the RN.

The RN performs the random access by using a non-backhaul link subframe, which also comprises the previous steps: the RN stops sending the broadcast and paging messages, and stops receiving, sending and feeding back the data of the Uu interface; the RN performs the random access by using a non-backhaul link subframe, which also comprises the follow-up steps: the RN continues to send the broadcast and paging messages and to provide the normal services for the R-UEs.

The RN performs the random access by using a non-backhaul link subframe, which also comprises the previous steps: the RN stops the UL and DL scheduling to the Uu interface; in the process that the RN performs the random access by using a non-backhaul link subframe, if the RN needs not to monitor the PDCCH message sent by the network side and the UL/DL receiving and sending in a subframe, and the subframe can be used for sending the broadcast or paging message, the RN sends the broadcast or paging message to the R-UEs by using the subframe.

In the process that the RN performs the random access by using a non-backhaul link subframe, if the RN needs not to monitor the PDCCH message sent by the network side and the UL/DL receiving and sending in a subframe, the RN sends the broadcast or paging message to the R-UEs by using the subframe and perform the UL and DL scheduling to the Uu interface.

It can be seen that, by using the method provided in the present invention, if a random access of an RN working in a base station state is triggered, the RN can perform the random access by using partial or all of non-backhaul link subframed, that is, the RN can perform the random access by using the subframes of the Uu interface, thus reducing the time delay for performing the random access of the RN working as a base station.

Figure 1:
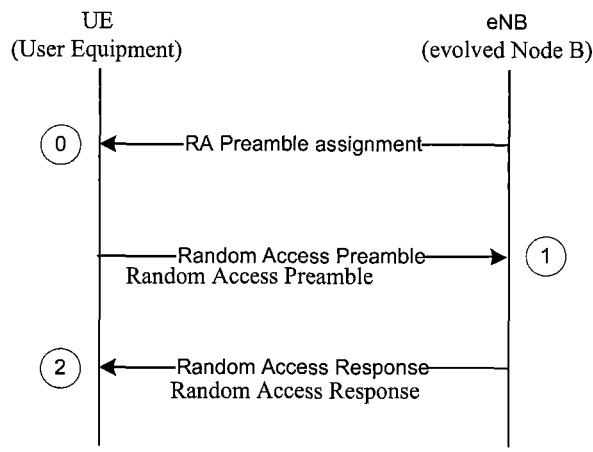
FIG. 1 is a basic process diagram of the non-contention based random access solution in the LTE system in the prior art.
Figure 2:
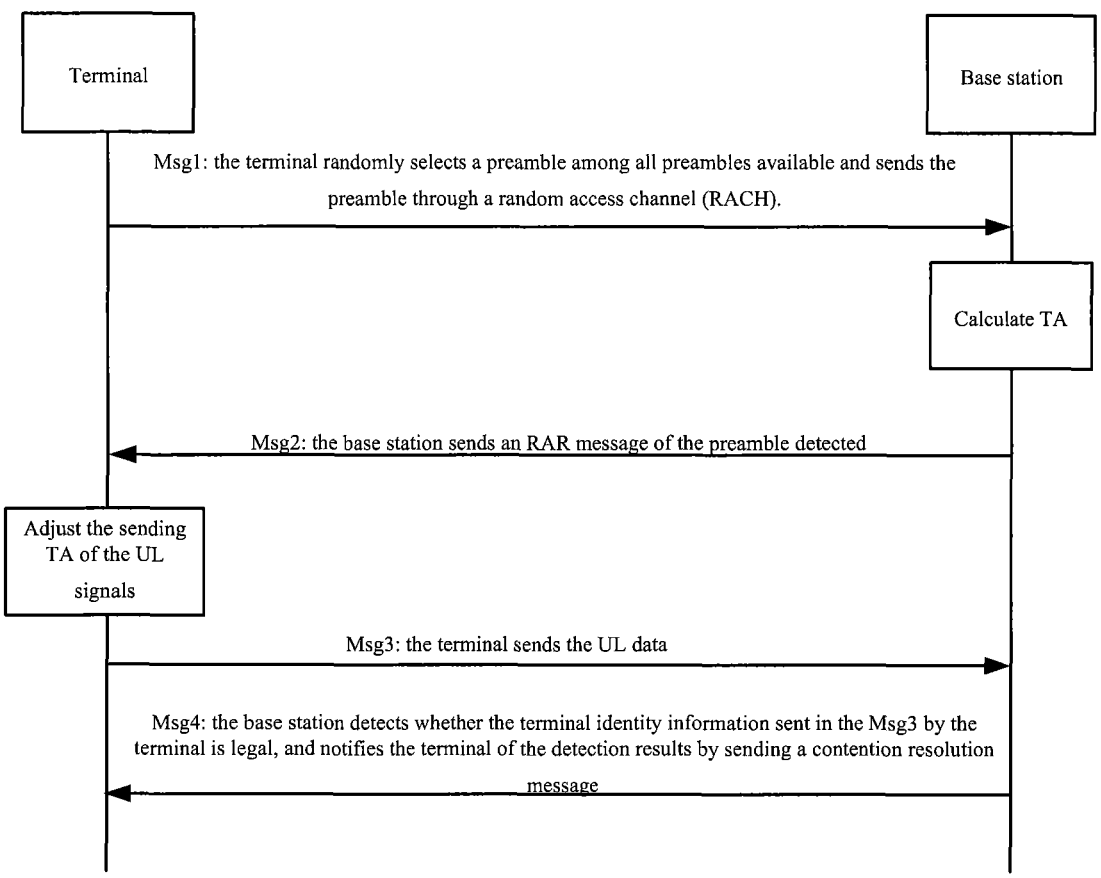
FIG. 2 is a basic process diagram of the contention-based random access solution in the LTE system in the prior art.
Figure 3:
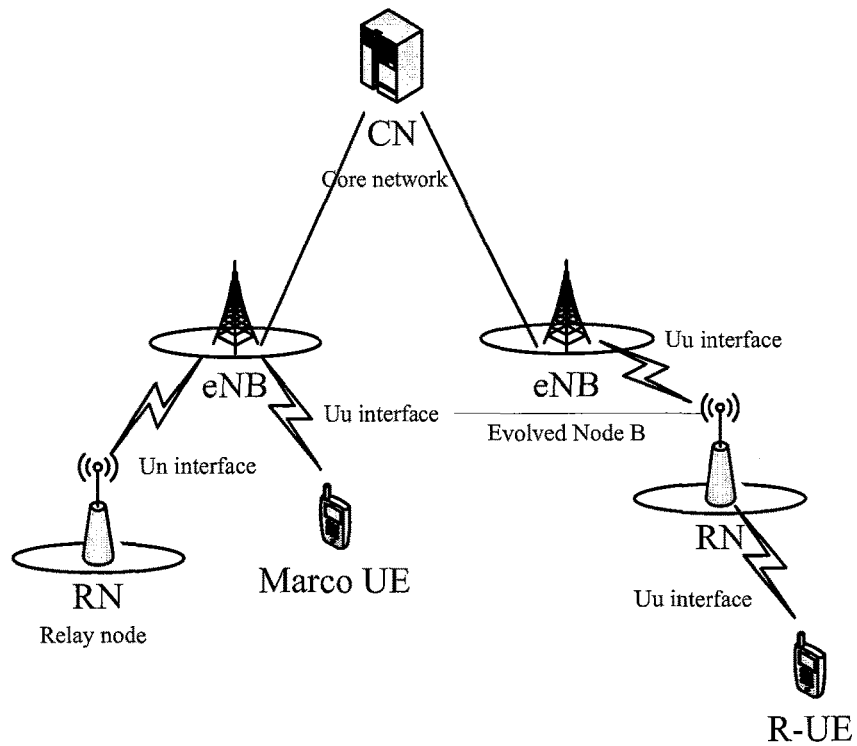
FIG. 3 is a network structure diagram of the LTE-A system in the prior art.
Figure 4:
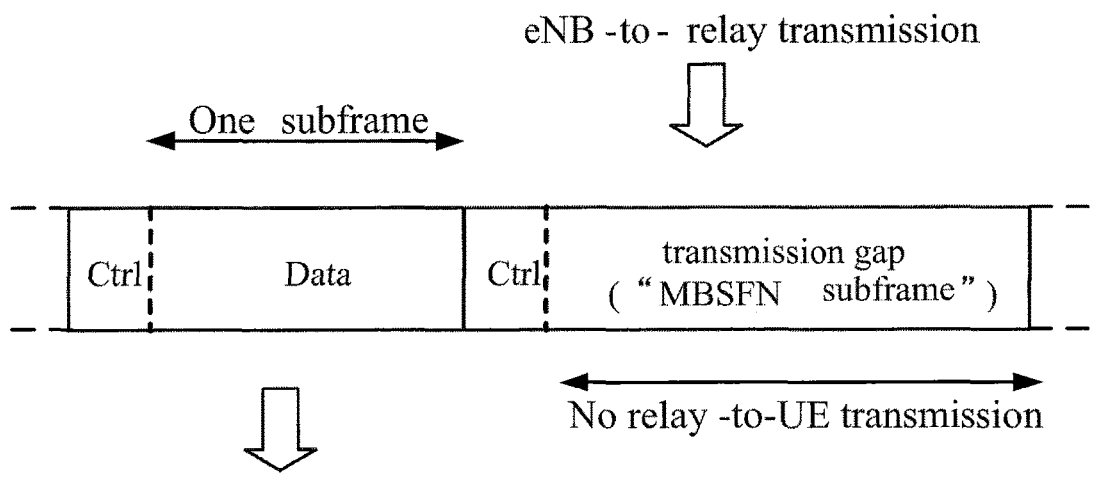
FIG. 4 is a schematic diagram of DL relay link transmission by using an MBSFN subframe in the prior art.

In the embodiments of the present invention, if a random access of an RN working in a base station state is triggered, the RN can perform the random access by using partial or all of non-backhaul (BH) link subframes. Based on the method of using the subframes, when the RN working as a base station performs a contention-based random access, the processing methods of the messages (Msg1, Msg2, Msg3 and Msg4 as shown in FIG. 2) include:

(1) Sending of the Msg1

If a random access of an RN working in a base station state is triggered, the Msg1 can be sent by the methods including but not limited to: sent only through a UL BH subframe, or sent by a UL non-BH subframe. It should be noted that when the Msg1 is sent through a UL non-BH subframe, the method is only applicable to occasions that no PRACH resources are allocated to the UL BH subframe or a high requirement for time delay of the random access is posed.

(2) Monitoring of the Msg2

The RN monitors the RAR messages in the subframes with PDCCHs (Physical Downlink Control Channel) in an RAR window, so that the Msg2 can be monitored without the limitation by the DL BH subframes. It should be noted that the PHCCH rather than the R-PHCCH (Relay Physical Downlink Control Channel) is monitored, and the R-PH-CCH is the PDCCH sent by the base station to the RN.

(3) Sending of the Msg3

The RN realizes the UL transmission of the Msg3 by using the scheduling information included in the RAR message received from the Msg2, wherein, when sending the Msg3, the RN can use the PUSCH (Physical Uplink Shared Channel) resources. It should be noted that if a new PUSCH format is introduced in the follow-up use by the RN, the RN can send the Msg3 by using the newly introduced PUSCH format.

(4) Receiving of the Msg4.

After receiving the Msg3 sent by the RN, the base station (DeNB) can determine that the random access is performed by the RN by using the identity information of the RN included in the Msg3. Correspondingly, the Msg4 may be received by the methods including but not limited to:

Method I: the RN monitors the Msg4 only in the DL BH subframes if the mac-ContentionResoulutionsTimer is running to receive the contention resolution message, in which case, it is required to use the R-PDCCH for scheduling and the R-PDSCH format for DL transmission.

Method II: the RN can monitor the Msg4 in the DL subframes if the mac-ContentionResoulutionsTimer is running to receive the contention resolution message, in which case, it is required to use the ordinary R-PDCCH for scheduling and the R-PDSCH format for DL transmission.

Based on the method of using the subframes, when the RN working as a base station performs a contention-based random access, the processing methods of the messages include:

(1) Sending of the Msg0

The base station sends the Msg0 through a DL SH subframe, and the RN monitors a dedicated preamble designed by the base station and received by the R-PCDDH and the PRACH resource instruction used for a random access. The PRACH resource instruction information possibly contains the carrier wave information and the PRACH resource instruction on some carrier wave. The PRACH resources can be designated by the base station without limitation by the BH subframes, and all subframe resources can be used.

(2) Sending of the Msg1

The RN sends the preamble to the base station according to the preamble and PRACH resources instructed in the Msg0. Without limitation by the BH subframes, the Msg1 may be sent by using the resources designated by the base station.

(3) Receiving of the Msg2

Without limitation by the BH resources, the Msg2 can be received by the methods including but not limited to: a. monitoring in the DL BH subframes with R-PDCCH in an RAR window, which is applicable to occasions when only the BH subframe is used in the random access procedure; b. monitoring in the DL subframes with R-PDCCH in the RAR window, which is applicable to occasions when the subframes can be used in the random access procedure.

It should be noted that, for the aforesaid contention/non-contention based random access, that whether the BH subframes can be used can be pre-designated by the system, or realized through notification by the base station in an explicit or implicit way, wherein, the explicit way specifically refers to radio resource control (RRC) message or broadcast, and there are many implicit ways, for example, for a non-contention based random access, that whether the non-BH subframes can be used can be judged by the Msg1 designated by the base station; for a contention based random access, the non-BH subframes can be used can be judged by the subframes sent by the Msg1.

Figure 6:
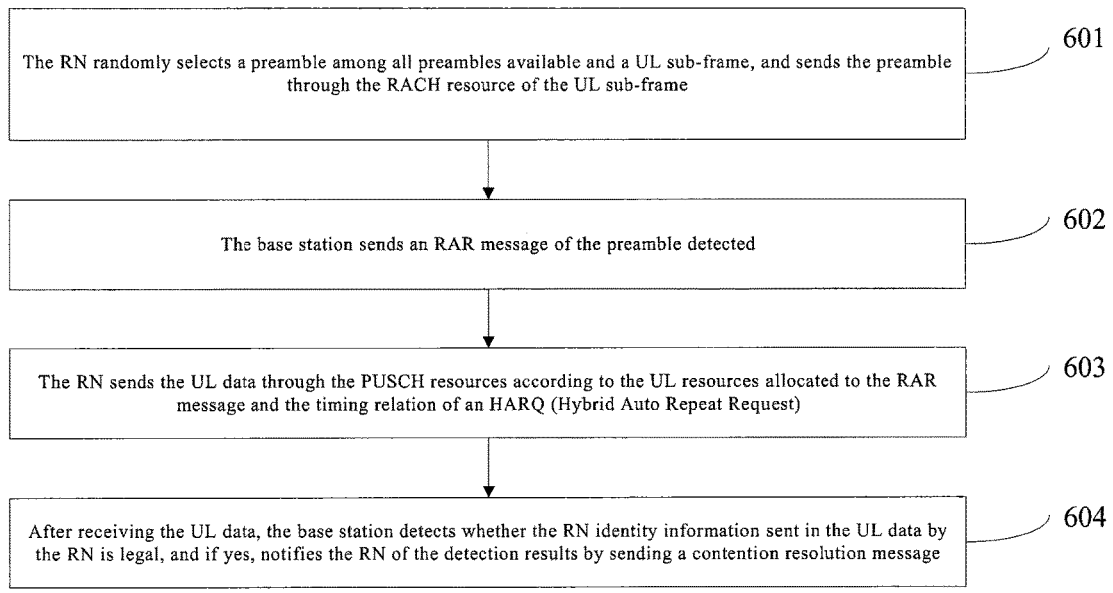
FIG. 6 is a process diagram for a random access method in a relay system provided in embodiment II of the present invention.

Based on the aforesaid situations, the embodiment II of the present invention provides a method for random access in a relay system. The embodiment II focuses on the processing procedure of the contention-based random access, without limitation by the subframes used by the RN, and the non-BH subframes can be used. As shown in FIG. 6, the method includes the following steps:

Step 601: the RN randomly selects a preamble among all preambles available and a UL subframe, and sends the preamble through the RACH resource of the UL subframe. When the RN sends the preamble, the base station detects the RACH, and calculates the corresponding TA of the preamble if the preamble is detected.

Step 602: the base station sends an RAR message of the preamble detected, which contains the following information: (1) identity information of the preamble received, such as serial number and sending time; (2) corresponding TA of the preamble received; (3) information on channel resources allocated for the subsequent UL data transmission, including the frequency-time position of resources and MCS (modulation and coding style), etc., and (4) a temporary ID allocated for users by the base station (such as C-RNTI).

Furthermore, the RN monitors the RAR message received in the DL subframes with PDCCHs in the RAR window. After monitoring the RAR message, the RN determines whether the target terminal of the RAR message is the RN itself by using the identity information of the preamble in the RAR message, and if yes, adjusts the sending TA of the UL signals according to the TA information in the RAR message.

Step 603: the RN sends the UL data through the PUSCH resources according to the UL resources allocated to the RAR message and the timing relation of an HARQ (Hybrid Auto Repeat Request), wherein, the UL data sent by the RN includes at least: identity information of the terminal, such as IMSI, TMSI or C-RNTI.

Step 604: after receiving the UL data, the base station detects whether the RN identity information sent in the UL data by the RN is legal, and if yes, notifies the RN of the detection results by sending a contention resolution message.

The RN monitors the PDCCHs in the DL subframes if the mac-ContentionResoulutionsTimer is running to receive the contention resolution message.

Figure 7:
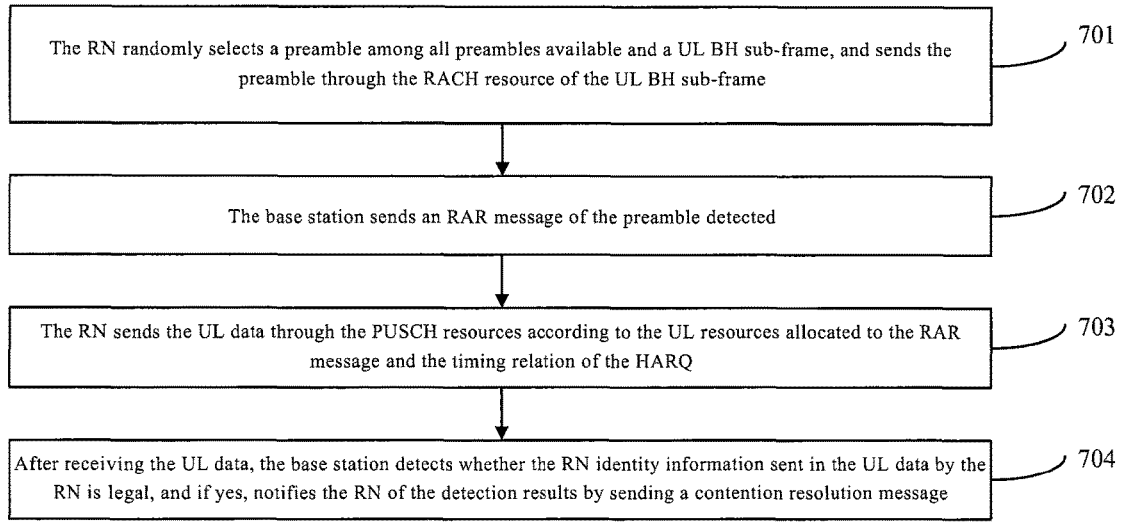
FIG. 7 is a process diagram for a random access method in a relay system provided in embodiment III of the present invention.

The embodiment III of the present invention provides a method for random access in a relay system. The embodiment III focuses on the processing procedure of the contention-based random access, wherein, the Msg1 is limited by using the BH subframes rather than using the non-BH subframes, and other messages which are not limited can use the subframes of the Uu interface. As shown in FIG. 7, the method includes the following steps:

Step 701: the RN randomly selects a preamble among all preambles available and a UL BH subframe, and sends the preamble through the RACH resource of the UL BH subframe. When the RN sends the preamble, the base station detects the RACH, and calculates the corresponding TA of the preamble if the preamble is detected.

Step 702: the base station sends an RAR message of the preamble detected.

Furthermore, the RN monitors the RAR message received in the DL subframes with PDCCHs in the RAR window. After monitoring the RAR message, the RN determines whether the target terminal of the RAR message is the RN itself by using the identity information of the preamble in the RAR message, and if yes, adjusts the sending TA of the UL signals according to the TA information in the RAR message.

Step 703: the RN sends the UL data through the PUSCH resources according to the UL resources allocated to the RAR message and the timing relation of the HARQ.

Step 704: after receiving the UL data, the base station detects whether the RN identity information sent in the UL data by the RN is legal, and if yes, notifies the RN of the detection results by sending a contention resolution message.

The RN monitors the PDCCHs in the DL subframes if the mac-ContentionResoulutionsTimer is running to receive the contention resolution message.

Figure 8:
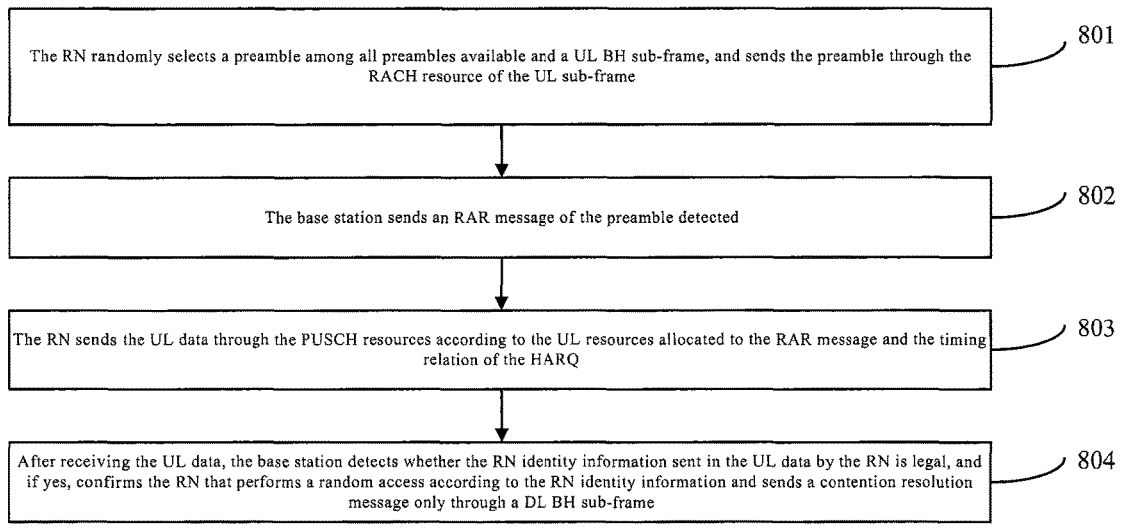
FIG. 8 is a process diagram for a random access method in a relay system provided in embodiment IV of the present invention.

The embodiment IV of the present invention provides a method for random access in a relay system. The embodiment IV focuses on the processing procedure of the contention-based random access, wherein, the Msg4 is limited only by using the BH subframes rather than using the non-BH subframes, and other messages which are not limited can use the subframes of the Uu interface. As shown in FIG. 8, the method includes the following steps:

Step 801: the RN randomly selects a preamble among all preambles available and a UL BH subframe, and sends the preamble through the RACH resource of the UL subframe. When the RN sends the preamble, the base station detects the RACH, and calculates the corresponding TA of the preamble if the preamble is detected.

Step 802: the base station sends an RAR message of the preamble detected.

Furthermore, the RN monitors the RAR message received in the DL subframes with PDCCHs in the RAR window. After monitoring the RAR message, the RN determines whether the target terminal of the RAR message is the RN itself by using the identity information of the preamble in the RAR message, and if yes, adjusts the sending TA of the UL signals according to the TA information in the RAR message.

Step 803: the RN sends the UL data through the PUSCH resources according to the UL resources allocated to the RAR message and the timing relation of the HARQ.

Step 804: after receiving the UL data, the base station detects whether the RN identity information sent in the UL data by the RN is legal, and if yes, confirms the RN that performs a random access according to the RN identity information and sends a contention resolution message only through the DL BH subframe.

Furthermore, the RN monitors the R-PDSCHs in the DL BH subframes if the mac-ContentionResoulutionsTimer is running to receive the contention resolution message, in which case, the R-PDSCH is used for the DL transmission of the Msg4.

Figure 9:
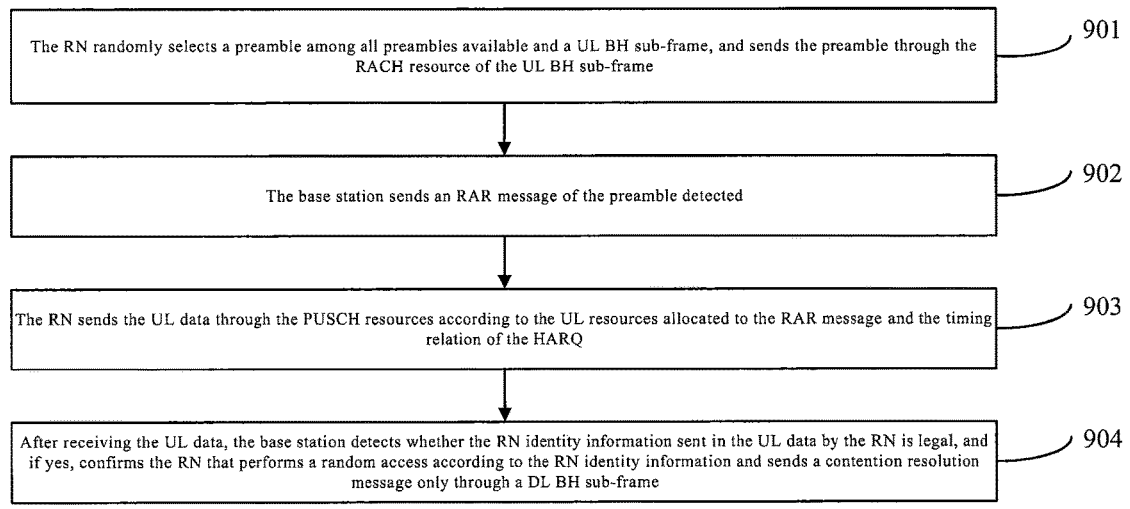
FIG. 9 is a process diagram for a random access method in a relay system provided in embodiment V of the present invention.

The embodiment V of the present invention provides a method for random access in a relay system. The embodiment V focuses on the processing procedure of the contention-based random access, wherein, the Msg1 and the Msg4 are simultaneously limited only by using the BH subframes rather than using the non-BH subframes, and other messages which are not limited can use the subframes of the Uu interface. As shown in FIG. 9, the method includes the following steps:

Step 901: the RN randomly selects a preamble and a UL BH subframe among all preambles available, and sends the preamble through the RACH resource of the UL BH subframe. When the RN sends the preamble, the base station detects the RACH, and calculates the corresponding TA of the preamble if the preamble is detected.

Step 902: the base station sends the RAR message of the preamble detected.

Furthermore, the RN monitors the RAR message received in the DL subframes with PDCCHs in the RAR window. After monitoring the RAR message, the RN determines whether the target terminal of the RAR message is the RN itself by using the identity information of the preamble in the RAR message, and if yes, adjusts the sending TA of the UL signals according to the TA information in the RAR message.

Step 903: the RN sends the UL data through the PUSCH resources according to the UL resources allocated to the RAR message and the timing relation of the HARQ.

Step 904: after receiving the UL data, the base station detects whether the RN identity information sent in the UL data by the RN is legal, and if yes, confirms the RN that performs a random access according to the RN identity information and sends a contention resolution message only through a DL BH subframe.

Furthermore, the RN monitors the R-PDSCHs in the DL BH subframes if the mac-ContentionResoulutionsTimer is running to receive the contention resolution message, in which case, the R-PDSCH is used for the DL transmission of the Msg4.

It should be noted that the processing procedure described in the embodiment II to the embodiment IV focuses on the contention-based random access, as to the processing mode of the non-contention based random access, it can be described in details in the following at least three cases:

In the first, the Msg1 and the Msg2 are limited only by using the BH subframes rather than the non-BH subframes:

(1) Processing of the Msg0

The base station designates a dedicated preamble for the RN and sends the UL CC and the PRACH resources on the UL CC of the dedicated preamble according to the preset principle (e.g. random access load). It should be noted that the PRACH resources selects a UL BH subframe and then indicate the preamble and the PRACH information to the RN via Msg0.

(2) Processing of the Msg1.

Upon receiving the instruction information, the RN sends the dedicated preamble according to the instruction of the base station.

(3) Processing of the Msg2.

After the preamble is detected, the base station sends a random access response message according to the preamble, wherein the random access response message can only be sent on a DL BH subframe configured for the RN of random access and the random access response message comprises at least the following: TA information and initial UL resource allocation for handover; TA information for DL data arrival; RA-preamble identity information; information on channel resources allocated for the subsequent UL data transmission, including the frequency-time position of resources and MCS, etc.; and a temporary ID allocated for users by the base station.

Furthermore, the RN monitors the R-PDCCHs in the DL subframes with R-PDCCHs in the RAR window to receive the RAR message, and adjusts the sending TA of the UL signals according to the TA information in the RAR message.

In the second case: only the Msg1 is limited only by using the BH subframes rather than non-BH subframes, (1) Processing of the Msg0.

The base station designates a dedicated preamble for the RN and sends the UL CC and the PRACH resources on the UL CC of the dedicated preamble according to the preset principle (e.g. random access load). It should be noted that the PRACH resources selects a UL BH subframe and then indicate the preamble and the PRACH information to the RN via Msg0.

(2) Processing of the Msg.

The RN, after receiving the instruction information, sends the dedicated preamble according to the instruction of the base station.

(3) Processing of the Msg2.

After the preamble is detected, the base station sends a random access response message according to the preamble, wherein the subframes for sending the RAR message are not limited to DL BH. Furthermore, the RN monitors PDCCHs in the DL subframes with PDCCHs in the RAR window to receive the RAR message, and adjusts the sending TA of the UL signals according to the TA information in the RAR message.

In the third case: Msg2 is limited only by using the BH subframes rather than non-BH subframes.

(1) Processing of the Msg0.

The base station designates a dedicated preamble for the RN and sends the UL CC and the PRACH resources on the UL CC of the dedicated preamble according to the preset principle (e.g. random access load). It should be noted that the PRACH resources selects a UL BH subframe and then indicate the preamble and the PRACH information to the RN via Msg0.

(2) Processing of the Msg1.

The RN, after receiving the instruction information, sends the dedicated preamble according to the instruction of the base station.

(3) Processing of the Msg2.

After the preamble is detected, the base station sends a random access response message according to the preamble, wherein the subframe for sending the random access response message is in DLBH subframe. The RN monitors R-PDCCHs in the DL subframes with R-PDCCHs in the RAR window to receive the RAR message, and adjusts the sending TA of the UL signals according to the TA information in the RAR message.

Figure 10:
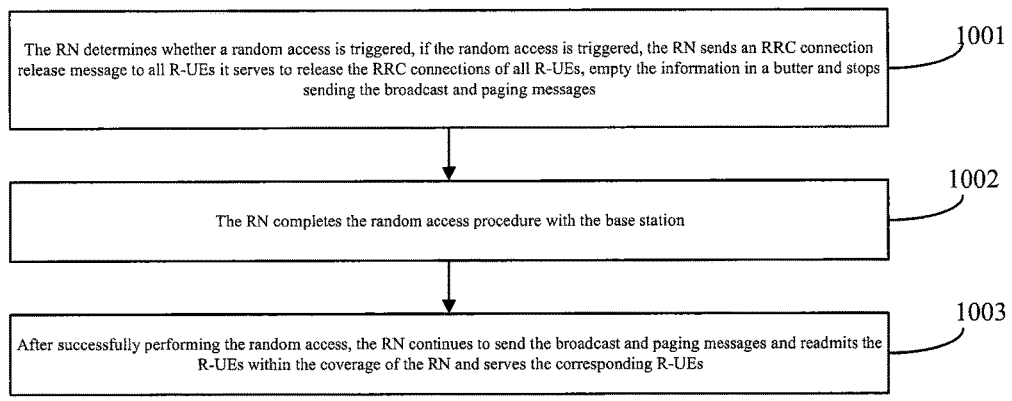
FIG. 10 is a process diagram for a random access method in a relay system provided in embodiment VI of the present invention.
Figure 11:
FIG. 11 is a schematic diagram of the corresponding RRC connection release procedure in embodiment VI.

In the process of the contention-based or non-contention based access, and providing that the aforesaid processing methods are employed for the messages, in the embodiment of the present invention, the processing of an R-UE, a system message and a paging message of a Uu interface in the processing of performing random access includes but not limited to: (1) the RN forcibly releases the RRC connection of the R-UE, and stops sending the system message and paging message; (2) the RN stops the scheduling and transmission of an R-UE and sends system messages and paging messages at the access link subframe positions of system messages and paging messages that are not occupied by the random access procedure; (3) the RN performs data scheduling and transmission in the access link subframes that are not occupied by the random access procedure and sends system messages and paging messages at the access link subframe positions of system messages and paging messages that are not occupied by the random access procedure;

Based on the abovementioned situations, the embodiment VI of the present invention provides a method for random access in a relay system, which focuses the processing of an R-UE in a random access performed by the RN. In the embodiment VI, the RN forcibly releases the RRC connection of the R-UE, and stops sending the system message and paging message. As shown in FIG. 10, the method includes the following steps:

Step 1001: the RN determines whether a random access is triggered, if the random access is triggered, the RN sends an RRC connection release message to all m R-UEs it serves to release the RRC connections of all R-UEs, empty the information in a butter and stops sending the broadcast and paging messages. FIG. 11 shows a schematic diagram of the RRC connection release procedure, that is, the RN sends an RRCConnectionRelease message to the R-UE.

Figure 12:
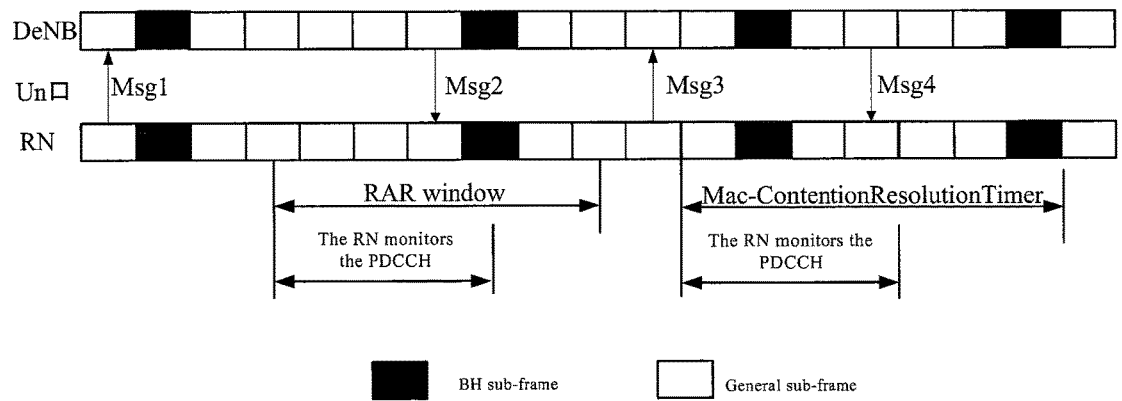
FIG. 12 is a schematic diagram of the timing relations of messages in the corresponding random access procedure in embodiment VI.

Step 1002: the RN completes the random access procedure with the base station, wherein, the RN can complete the random access procedure by using any of the aforesaid random access processes, that is, the RN completes the random access procedure by implementing any of the methods described in the embodiment II to Embodiment V. Taking the FDD (Frequency Division Duplex) as an example, the timing relations of the messages in the random access procedure is as shown in FIG. 12.

Step 1003: after successfully performing the random access, the RN continues to send the broadcast and paging messages and readmits the R-UEs within the coverage of the RN and serves the corresponding R-UEs.

Figure 13:
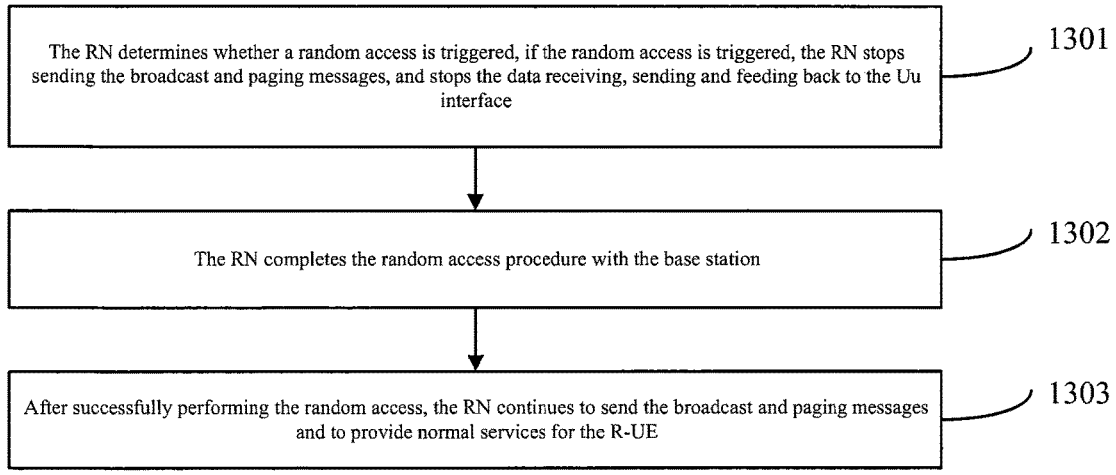
FIG. 13 is a process diagram of a random access method in a relay system provided in embodiment VII of the present invention.
Figure 14:
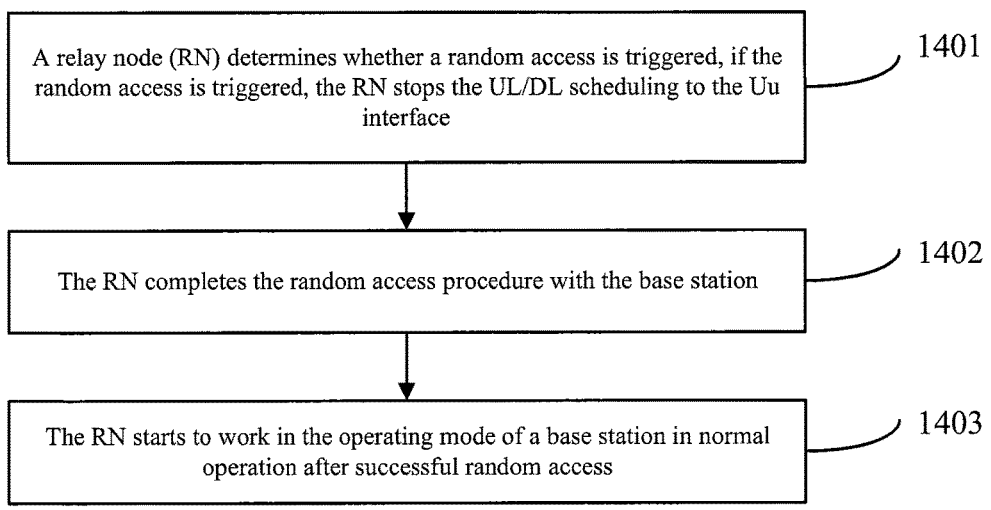
FIG. 14 is a process diagram of a random access method in a relay system provided in embodiment VIII of the present invention.

The embodiment VII of the present invention provides a method for random access in a relay system, which focuses the processing procedure of an R-UE in a random access performed by the RN. In the embodiment VII, the RN does not release the R-UE, but stops the communication with the R-UE in the random access procedure. As shown in FIG. 13, the method includes the following steps:

Step 1301: the RN determines whether a random access is triggered, if the random access is triggered, the RN stops sending the broadcast and paging messages, and stops the data receiving, sending and feeding back to a Uu interface.

Step 1302: the RN completes the random access procedure with the base station, wherein, the RN can complete the random access procedure by using any of the aforesaid random access processes, that is, the RN completes the random access procedure by implementing any of the methods described in the embodiment II to Embodiment V. Taking the FDD as an example, the timing relations of the messages in the random access procedure is as shown in FIG. 12.

Step 1303: after successfully performing the random access, the RN continues to send the broadcast and paging messages and to provide normal services for the R-UE.

The embodiment VIII of the present invention provides a method for random access in a relay system, which focuses the processing procedure of an R-UE in a random access performed by the RN. In the embodiment VIII, the RN does not release the R-UE, but stops the scheduling and transmission of an R-UE and sends system messages and paging messages as usual at the access link subframe positions of system messages and paging messages that are not occupied by the random access procedure. As shown in FIG. 13, the method includes the following steps:

Step 1401: a relay node (RN) determines whether a random access is triggered, if the random access is triggered, the RN stops the UL/DL scheduling to the Uu interface.

Step 1402: the RN completes the random access procedure with the base station, wherein, the RN can complete the random access procedure by using any of the aforesaid random access processes, that is, the RN completes the random access procedure by implementing any of the methods described in the embodiment II to Embodiment V.

Figure 15:
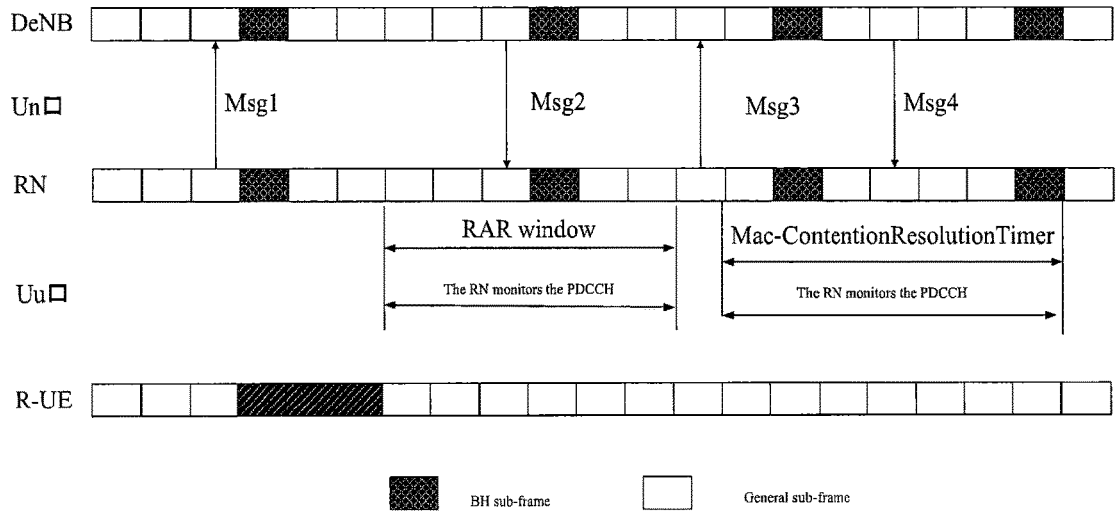
FIG. 15 is a schematic diagram of the timing relations of messages in the corresponding random access procedure in embodiment VIII.

Specifically, in the process that the RN performs the random access with the base station, if the RN needs not to monitor the PDCCH message of a Un interface and UL/DL receiving and sending in a subframe, the RN can send the broadcast or paging message to the R-UEs by using the subframe. In FIG. 15, which is a schematic diagram of the timing relations of messages in the random access procedure, subframes that may be used for sending broadcast, paging messages and the like at a Uu interface are indicated by oblique line.

Step 1403: the RN starts to work in the operating mode of a base station in normal operation after successful random access.

Figure 16:
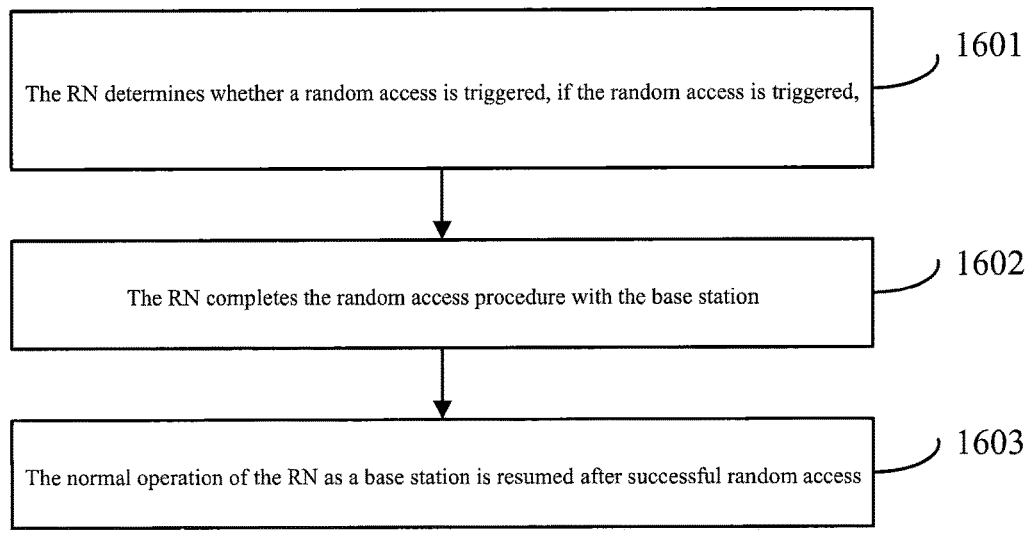
FIG. 16 is a process diagram of a random access method in a relay system provided in embodiment IX of the present invention.

The embodiment IX of the present invention provides a method for random access in a relay system, which focuses the processing procedure of an R-UE in a random access performed by the RN. In the embodiment IX, the RN does not release the R-UE, but performs data scheduling and transmission in the access link subframes that are not occupied by the random access procedure and sends system messages and paging messages as usual at the access link subframe positions of system messages and paging messages that are not occupied by the random access procedure. As shown in FIG. 16, the method includes the following steps:

Step 1601: the RN determines whether a random access is triggered, if the random access is triggered, the RN performs step 1602.

Step 1602: the RN completes the random access procedure with the base station, wherein, the RN can complete the random access procedure by using any of the aforesaid random access processes, that is, the RN completes the random access procedure by implementing any of the methods described in the embodiment II to Embodiment V.

Figure 17:
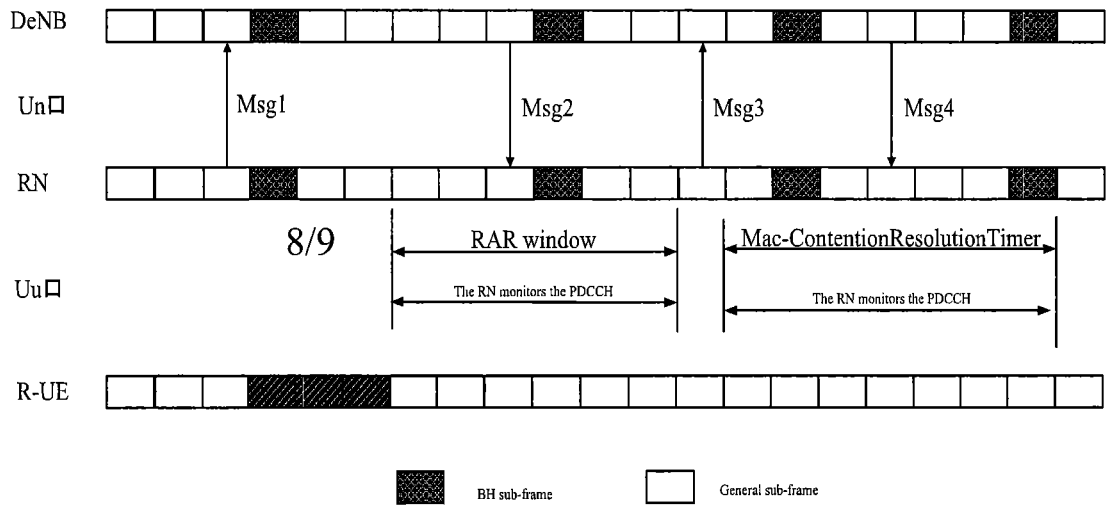
FIG. 17 is a schematic diagram of the timing relations of messages in the corresponding random access procedure in embodiment IX.

Specifically, in the process that the RN performs the random access with the base station, if the RN needs not to monitor the PDCCH message of a Un interface and UL/DL receiving and sending in a subframe, the RN can send broadcast or paging messages by using the subframe and perform UL/DL scheduling to the Uu interface. In FIG. 17, which is a schematic diagram of the timing relations of messages in the random access procedure, subframes that may be used for sending broadcast and paging messages and UL/DL scheduling at a Uu interface are indicated by oblique line.

Step 1603: the normal operation of the RN as a base station is resumed after successful random access.

Wherein, the steps in the preferred embodiments of the present invention can be adjusted according to the actual needs.

It can be seen that, by using the methods provided in the embodiments of the present invention, if a random access of an RN working in a base station state is triggered, the RN can perform the random access by using partial or all of non-backhaul link subframes, that is the RN can perform the random access by using the subframes of the Uu interface, thus reducing the time delay for performing the random access of the RN working as a base station and improving the user experience.

Figure 18:
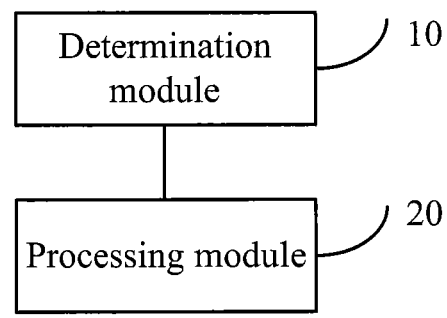
FIG. 18 is a structure diagram of a random access apparatus in a relay system provided in the embodiments of the present invention.

Based on the inventive concepts that are the same with the aforesaid method, the embodiment of the present invention further provides an apparatus for random access in a relay system, as shown in FIG. 18, comprising:

A determination module 10 for determining whether a random access is triggered; and A processing module 20 for performing the random access by using a non-backhaul link subframe if the random access is triggered according to the judgment of the determination module.

Specifically, for a contention-based random access, if the subframes used by the RN are not limited, the processing module 20 is specifically used for: selecting a preamble and a UL subframe, and sending the preamble to a network side by using the RACH resources of the UL subframe; monitoring the DL subframes with PDCCHs in an RAR window when the network side detects the preamble and sends an RAR message to the RN, to receive the RAR message and send the UL data to the network side by using the UL resources allocated in the RAR message; and receiving the contention resolution message in the DL subframes with PDCCH if the mac-ContentionResolution timer is running when the network side sends a contention resolution message according to the UL data.

If the Msg1 is limited by using the UL BH subframes, the processing module 20 is specifically used for: selecting a preamble and a UL subframe, and sending the preamble to a network side by using the RACH resources of the UL BH subframe; monitoring the DL subframes with PDCCHs in an RAR window when the network side detects the preamble and sends an RAR message to the RN, to receive the RAR message and send the UL data to the network side by using the UL resources allocated in the RAR message; and receiving the contention resolution message in the DL subframes with PDCCH if the mac-ContentionResolution timer is running when the network side sends a contention resolution message according to the UL data.

If the Msg4 is limited by using the BH subframes, the processing module 20 is specifically used for: selecting a preamble and a UL subframe, and sending the preamble to a network side by using the RACH resources of the UL subframe; monitoring the DL subframes with PDCCHs in an RAR window when the network side detects the preamble and sends an RAR message to the RN, to receive the RAR message and send the UL data to the network side by using the UL resources allocated in the RAR message; and receiving the contention resolution message in the DL subframes with PDCCH if the mac-ContentionResolution timer is running when the network side sends a contention resolution message according to the UL data.

If the Msg1 and the Msg4 are simultaneously limited by using the BH subframes, the processing module 20 is specifically used for: selecting a preamble and a UL BH subframe, and sending the preamble to a network side by using the RACH resources of the UL BH subframe; monitoring the DL subframes with PDCCHs in an RAR window when the network side detects the preamble and sends an RAR message to the RN, to receive the RAR message and send the UL data to the network side by using the UL resources allocated in the RAR message; and receiving the contention resolution message in the DL BH subframes with PDCCH if the mac-ContentionResolution timer is running when the network side sends a contention resolution message according to the UL data.

For a non-contention based random access, if the Msg1 and the Msg2 are simultaneously limited only by using the BH subframes, the processing module 20 is specifically used for: receiving a dedicated preamble assigned for the RN and a PRACH message sent by the network side through a DL BH subframe; and sending the dedicated preamble to the network side through the UL BH subframe according to the dedicated preamble and the PRACH message; receiving an RAR message sent by the network side through the DL BH subframe allocated for the RN according to the dedicated preamble; and monitoring the R-PDCCHs in the DL subframes with R-PDCCHs in the RAR window to receive the RAR message.

If the Msg1 is limited only by using the BH subframes rather than the non-BH subframes, the processing module 20 is specifically used for: receiving a dedicated preamble assigned for the RN and a PRACH message sent by the network side through a DL BH subframe; and sending the dedicated preamble to the network side through the UL BH subframe according to the dedicated preamble and the PRACH message; receiving an RAR message sent by the network side through the DL BH subframe allocated for the RN according to the dedicated preamble, wherein the subframes used for sending the RAR message are not limited to DL BH; and monitoring the PDCCHs in the DL subframes with PDCCHs in the RAR window to receive the RAR message.

If the Msg2 is limited only by using the BH subframes rather than the non-BH subframes, the processing module 20 is specifically used for: receiving a dedicated preamble assigned for the RN and a PRACH message sent by the network side through a DL BH subframe; and sending the dedicated preamble to the network side through the UL BH subframe or a UL non-BH subframe according to the dedicated preamble and the PRACH message; receiving an RAR message sent by the network side through the DL BH subframe allocated for the RN according to the dedicated preamble; and monitoring the R-PDCCHs in the DL subframes with R-PDCCHs in the RAR window to receive the RAR message.

The method for confirming whether the RN is allowed to use the non-BH subframes includes: pre-designation by the system, or notification by the network side in an explicit or implicit way, wherein, the notification by the network side in the explicit way specifically refers to notification by broadcasting or RRC message.

Further, the processing module 20 is also used for: sending an RRC connection release message to all R-UEs that the RN serves before the RN performs the random access by using a non-backhaul link subframe; and continuing to send the broadcast and paging messages and readmit the R-UEs within the coverage of the RN after the RN performs the random access by using a non-backhaul link subframe.

The processing module 20 is also used for: stopping sending the broadcast and paging messages and stopping receiving, sending and feeding back the data of the Uu interface before the RN performs the random access by using a non-backhaul link subframe; and continuing to send the broadcast and paging messages and to provide normal services for the R-UEs after the RN performs the random access by using a non-backhaul link subframe.

The processing module 20 is also used for: stopping the UL/DL scheduling to the Uu interface before the RN performs the random access by using a non-backhaul link subframe; and sending the broadcast or paging message to the R-UEs by using the subframe in the process that the RN performs the random access by using a non-backhaul link subframe, provided that the RN needs not to monitor the PDCCH message sent by the network side and the UL/DL receiving and sending in a subframe, and the subframe can be used for sending the broadcast or paging message.

The processing module 20 is also used for: sending the broadcast or paging message to the R-UEs by using the subframe, and performs the UL and DL scheduling to the Uu interface in the process that the RN performs the random access by using a non-backhaul link subframe, provided that the RN needs not to monitor the PDCCH message sent by the network side and the UL/DL receiving and sending in a subframe.

Wherein, the modules of the apparatus provided in the present invention can be integrated or split. The aforesaid modules can be integrated to a module or further split into a plurality of sub-modules.

With the description of the preferred embodiments hereinabove, those skilled in the art can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the prior art can be reflected in the form of a software product, which is saved in a memory medium comprising instructions to enable a computer equipment, which could be a personal computer, a server or a network apparatus, etc. to carry out the methods for each embodiment of the present invention.

As will be appreciated by one of skill in the art, the drawings are only schematic drawings of a preferred embodiment, and the module or procedure in the drawings is not necessarily a must for the embodiments of the present invention.

As will be appreciated by one of skill in the art, the modules in the apparatus provided by the embodiments can be distributed in the apparatus provided by the embodiments according to the description of the embodiments, and can be placed in a or a plurality of apparatus(s) different from the embodiment after corresponding changes as well. The aforesaid modules of the embodiments can be integrated into a module or further split into a plurality of modules.

The aforesaid serial number of the embodiments of the present invention is used only for description and shall not indicate any rank of the embodiments with respect to advantages or disadvantages.

The aforesaid disclosures are only a plurality of embodiments of the present invention and the present invention is not confined to these embodiments. All changes that those skilled in the art can think of shall fall within the protection scope of the present invention.

The invention claimed is:

1. A method for a random access in a relay system, comprising:
    determining, by a relay node (RN) operating in a base station mode, whether a random access of the RN is triggered; and
    when the random access is triggered, performing, by the RN, the random access by using a non-backhaul link subframe,
    wherein the non-backhaul link subframe comprises downlink (DL) subframes with physical downlink control channels (PDCCHs) and uplink (UL) subframes.

2. The method as claimed in claim 1, wherein for a contention-based random access, when the subframes used by the RN are not limited, step of performing, by the RN, the random access by using a non-backhaul link subframe, comprises:
    selecting, by the RN a random access preamble and an uplink (UL) subframe, and sending the preamble to a network side by using a random access channel (RACH) of the UL subframe;
    after detecting the preamble by the network side, sending, by the network side, a random access response (RAR) message to the RN, monitoring, by the RN, all downlink (DL) subframes with physical downlink control channels (PDCCHs) in an RAR window to receive the RAR message, and sending UL data to the network side by using UL resources allocated through the RAR message;
    when the network side sends a contention resolution message according to the UL data, receiving, by the RN, the contention resolution message in all the DL subframes with PDCCHs during a mac contention resolution (mac-ContentionResolution) timer is running.

3. The method as claimed in claim 1, wherein for a contention-based random access, when a first message (Msg1) which is a random access preamble message sent by a user equipment (UE) to a network side is limited to use UL backhaul link (BH) subframes, step of performing, by the RN, the random access by using a non-backhaul link subframe, comprises:
    selecting, by the RN, a preamble and a UL BH subframe, and sending the preamble to a network side by using RACH resources of the UL BH subframe;
    after detecting the preamble by the network side, sending, by the network side, an RAR message to the RN, monitoring, by the RN, all DL subframes with PDCCHs in an RAR window to receive the RAR message, and sending UL data to the network side by using uplink resources allocated through the RAR message;
    when the network side sends a contention resolution message according to the UL data, receiving, by the RN, the contention resolution message in all the DL subframes with PDCCHs during a mac-ContentionResolution timer is running.

4. The method as claimed in claim 1, wherein for a contention-based random access, when a fourth message (Msg4) which is a contention resolution message sent by a network side to a user equipment is limited to use BH subframes, step of performing, by the RN, the random access by using a non-backhaul link subframe, comprises:
    selecting, by the RN, a preamble and a UL subframe, and sending the preamble to a network side by using RACH resources of the UL subframe;
    after detecting the preamble by the network side, sending, by the network side, an RAR message to the RN, monitoring, by the RN, all DL subframes with PDCCHs in an RAR window to receive the RAR message, and sending UL data to the network side by using UL resources allocated through the RAR message;
    when the network side sends a contention resolution message according to the UL data, receiving, by the RN, the contention resolution message in all DL BH subframes with relay PDCCHs (R-PDCCHs) during a mac-ContentionResolution timer is running.

5. The method as claimed in claim 1, wherein for a contention-based random access, when Msg1 and Msg4 are simultaneously limited to use BH subframes, step of performing, by the RN, the random access by using a non-backhaul link subframe, comprises:
  selecting, by the RN, a preamble and a UL BH subframe, and sending the preamble to a network side by using RACH resources of the UL BH subframe;
  after detecting the preamble by the network side, sending, by the network side, an RAR message to the RN, monitoring, by the RN, all DL subframes with PDCCHs in an RAR window to receive the RAR message, and sending UL data to the network side by using the UL resources allocated through the RAR message;
  when the network side sends a contention resolution message according to the UL data, receiving, by the RN, the contention resolution message in all the DL BH subframes with R-PDCCH during a mac-Contention-Resolution timer is running.

6. The method as claimed in claim 1, wherein for a non-contention based random access, when Msg1 and a second message (Msg2) which is a RAR message sent by a network side to a user equipment are simultaneously limited only to use BH subframes, step of performing, by the RN, the random access by using a non-backhaul link subframe, comprises:
  sending, by the network side, a dedicated preamble assigned for the RN and a packet random access channel (PRACH) message to the RN through a DL BH subframe;
  sending, by the RN, the dedicated preamble to the network side througha UL BH subframe according to the dedicated preamble and the PRACH message;
  sending, by the network side, an RAR message to the RN through a DL BH subframe allocated for the RN according to the dedicated preamble;
  monitoring, by the RN, R-PDCCHs in all DL subframes with R-PDCCHs in an RAR window to receive the RAR message.

7. The method as claimed in claim 1, wherein for a non-contention based random access, when Msg1 is limited only to use BH subframes rather than the non-BH subframes, step of performing, by the RN, the random access by using a non-backhaul link subframe, comprises:
  sending, by the network side, a dedicated preamble assigned for the RN and a PRACH message to the RN through a DL BH subframe;
  sending, by the RN, the dedicated preamble to the network side through a UL BH subframe according to the dedicated preamble and the PRACH message;
  sending, by the network side, an RAR message to the RN according to the dedicated preamble, wherein subframes used for sending the RAR message are not limited by the DL BH;
  monitoring, by the RN, PDCCHs in all DL subframes with PDCCHs in an RAR window to receive the RAR message.

8. The method as claimed in claim 1, wherein for a non-contention based random access, when Msg2 is limited only to use BH subframes rather than the non-BH subframes, step of performing, by the RN, the random access by using a non-backhaul link subframe, comprises:
  sending, by the network side, a dedicated preamble assigned for the RN and a PRACH message to the RN through a DL BH subframe;
  sending, by the RN, the dedicated preamble to the network side throughaUL BH subframe or a UL non-BH subframe according to the dedicated preamble and the PRACH message;
  sending, by the network side, an RAR message to the RN througha DL BH subframe according to the dedicated preamble;
  monitoring, by the RN, R-PDCCHs in all DL subframes with R-PDCCHs in an RAR window to receive the RAR message.

9. The method as claimed in claim 2, wherein whether the RN is allowed to use the non-BH subframes is obtained by the following manner: pre-designation by the system, or notification by the network side in an explicit or implicit way, wherein the notification by the network side in the explicit way specifically refers to notification by broadcasting or radio resource control (RRC) signaling.

10. The method as claimed in claim 1, wherein before the step of performing, by the RN, the random access by using a non-backhaul link subframe, the method also comprises steps of:
  sending, by the RN, an RRC connection release message to all R-UEs that it serves where R-UE refers to a UE directly connected with an RN, releasing the RRC connections of all R-UES, and stopping sending broadcast and paging messages; or,
  stopping, by the RN, sending broadcast and paging messages, and stopping data receiving, sending and feeding back of a Uu interface; or,
  stopping, by the RN, UL/DL scheduling to the Uu interface, and during the process that the RN performs the random access by using a non-backhaul link subframe, when the RN needs not to monitor the PDCCH message sent by the network side and the UL/DL receiving and sending in a subframe, and the subframe can be used for sending the broadcast or paging message, then sending, by the RN, the broadcast or paging message to the R-UEs by using the subframe; and
  sequence to the step of performing, by the RN, the random access by using a non-backhaul link subframe, the method also comprises steps of:
  continuing, by the RN, to send the broadcast and paging messages, and readmitting the R-UES within a coverage of the RN; or,
  continuing, by the RN, to send the broadcast and paging messages and to provide normal services for the R-UEs.

11. An apparatus for a random access in a relay system, comprising:
  a determination circuit, which is used for determining, in a case that a relay node (RN) is operating in a base station mode, whether a random access of the RN is triggered; and
  a processing circuit, which is used for performing the random access by using a non-backhaul link subframe when the random access is triggered according to the judgment of the determination circuit,
  wherein the non-backhaul link subframe comprises downlink (DL) subframes with physical downlink control channels (PDCCHs) and uplink (UL) subframes.

12. The apparatus as claimed in claim 11, wherein for a contention-based random access, when the subframes used by the RN are not limited, the processing circuit is specifically used for:
  selecting a preamble and a UL subframe, and sending the preamble to a network side by using the RACH resources of the UL subframe;
  monitoring all DL subframes with PDCCHs in an RAR window when the network side detects the preamble and sends an RAR message to the RN, to receive the RAR message, and sending the UL data to the network side by using the UL resources allocated through the RAR message; and receiving a contention resolution message in all DL subframes with PDCCHs during a mac contention resolution (mac-ContentionResolution timer) is running when the network side sends the contention resolution message according to the UL data.

13. The apparatus as claimed in claim 11, wherein for a contention-based random access, when a first message (Msg1) which is a random access preamble message sent by a user equipment (UE) to a network side is limited to use UL BH subframes, the processing circuit is specifically used for:

selecting a preamble and a UL subframe, and sending the preamble to a network side by using RACH resources of the UL BH subframe;

monitoring all DL subframes with PDCCHs in an RAR window when the network side detects the preamble and sends an RAR message to the RN, to receive the RAR message and sending the UL data to the network side by using UL resources allocated through the RAR message; and receiving a contention resolution message in all DL subframes with PDCCHs during a mac-ContentionResolution timer is running when the network side sends a contention resolution message according to the UL data.

14. The apparatus as claimed in claim 11, wherein for a contention-based random access, when a fourth message (Msg4) which is a contention resolution message sent by a network side to a user equipment is limited to use BH subframes, the processing circuit is specifically used for:

selecting a preamble and a UL subframe, and sending the preamble to a network side by using RACH resources of the UL subframe;

monitoring all DL subframes with PDCCHs in an RAR window when the network side detects the preamble and sends an RAR message to the RN, to receive the RAR message, and sending the UL data to the network side by using UL resources allocated through the RAR message; and receiving a contention resolution message in all DL subframes with relay PDCCHs (R-PDCCHs) during a mac-ContentionResolution timer is running when the network side sends the contention resolution message according to the UL data.

15. The apparatus as claimed in claim 11, wherein for a contention-based random access, when Msg1 and Msg4 are simultaneously limited to use the BH subframes, the processing circuit is specifically used for:

selecting a preamble and a UL BH subframe, and sending the preamble to a network side by using RACH resources of the UL BH subframe;

monitoring all DL subframes with PDCCHs in an RAR window when the network side detects the preamble and sends an RAR message to the RN, to receive the RAR message, and sending UL data to the network side by using the UL resources allocated through the RAR message; and receiving a contention resolution message in all DL BH subframes with R-PDCCH during a mac-ContentionResolution timer is running when the network side sends the contention resolution message according to the UL data.

16. The apparatus as claimed in claim 11, wherein for a non-contention based random access, when Msg1 and a second message (Msg2) which is a RAR message sent by a network side to a user equipment are simultaneously limited to use the BH subframes, the processing circuits specifically used for:

receiving a dedicated preamble assigned for the RN and a packet random access channel (PRACH) message sent by the network side through a DL BH subframe;

sending the dedicated preamble to the network side through a UL BH subframe according to the dedicated preamble and the PRACH message;

receiving an RAR message sent by the network side through a DL BH subframe allocated for the RN according to the dedicated preamble; and monitoring the R-PDCCHs in all DL subframes with R-PDCCHs in an RAR window to receive the RAR message.

17. The apparatus as claimed in claim 11, wherein for a non-contention based random access, when Msg1 is limited only to use the BH subframes rather than the non-BH subframes, the processing circuit is specifically used for:

receiving a dedicated preamble assigned for the RN and a PRACH message sent by the network side through a DL BH subframe;

sending the dedicated preamble to the network side through a UL BH subframe according to the dedicated preamble and the PRACH message;

receiving an RAR message sent by the network side through the DL BH subframe allocated for the RN according to the dedicated preamble, wherein subframes for sending the RAR message are not limited by the DL BH; and monitoring R-PDCCHs in all DL subframes with R-PDCCHs in an RAR window to receive the RAR message.

18. The apparatus as claimed in claim 11, wherein for a non-contention based random access, when Msg2 is limited only to use BH subframes rather than the non-BH subframes, the processing circuit is specifically used for:

receiving a dedicated preamble assigned for the RN and a PRACH message sent by the network side through a DL BH subframe;

sending the dedicated preamble to the network side through a UL BH subframe or a UL non-BH subframe according to the dedicated preamble and the PRACH message;

receiving an RAR message sent by the network side through a DL BH subframe allocated for the RN according to the dedicated preamble; and monitoring R-PDCCHs in all DL subframes with R-PDCCHs in an RAR window to receive the RAR message.

19. The apparatus as claimed in claim 12, wherein whether the RN is allowed to use the non-BH subframes is obtained by the following manner: pre-designation by the system, or notification by the network side in an explicit or implicit way, wherein the notification by the network side in the explicit way specifically refers to notification by broadcasting or RRC signaling.

20. The apparatus as claimed in claim 11, wherein the processing circuit is also used for:

sending an RRC connection release message to all R-UEs that the RN serves before the RN performs the random access by using a non-backhaul link subframe, releasing the RRC connections of all R-UEs, and stopping sending broadcast and paging messages; and continuing to send the broadcast and paging messages and readmitting the R-UEs within a coverage of the RN after the RN performs the random access by using the non-backhaul link subframe; or, stopping sending the broadcast and paging messages and stopping data receiving, sending and feeding back of the Uu interface before the RN performs the random access by using a non-backhaul link subframe; and continuing to send the broadcast and paging messages and to provide normal services for the R-UEs after the RN performs the random access by using a non-backhaul link subframe; or, stopping UL/DL scheduling to the Uu interface before the RN performs the random access by using a non-backhaul link subframe; and sending the broadcast or paging message to the R-UES by using the subframe, when the RN needs not to monitor the PDCCH message sent by the network side and the UL/DL receiving and sending in a subframe, and the subframe can be used for sending the broadcast or paging message, during the process that the RN performs the random access by using a non-backhaul link subframe.

* * * * *